United States Patent Office 3,279,898
Patented Oct. 18, 1966

3,279,898
METHOD OF PREPARING PLUTONIUM MONONITRIDE
Joseph A. Leary and Robert L. Nance, Los Alamos, N. Mex., assignors to the United States of America as represented by the United States Atomic Energy Commission
No Drawing. Filed Jan. 13, 1965, Ser. No. 425,358
4 Claims. (Cl. 23—344)

This invention is concerned with a method of preparing plutonium mononitride and in particular with a process that produces a non-pyrophoric plutonium nitride when it is exposed to a normal or air atmosphere.

A plutonium nitride compound that is non-pyrophoric is, without question, a major breakthrough for this compound since the ability to handle the plutonium nitride in air would greatly simplify safety precautions, equipment, and subsequently reduce the cost of using this fuel in a reactor. Present processes for preparing plutonium nitride form a plutonium nitride that must be handled in an inert atmosphere. To distinguish this prior art over this invention, we are submitting the following description as to the manner the prior plutonium nitride is made:

Plutonium metal powder and/or plutonium hydride is reacted with nitrogen gas at temperatures up to but not exceeding 600° C. The plutonium nitride thus produced is highly pyrophoric when exposed to air and generally is slightly deficient in nitrogen. The present inventors have discovered the cause of this pyrophoricity. It is attributed to the presence of a small amount of unreacted plutonium metal and/or plutonium hydride being trapped in the plutonium mononitride. The removal of all the plutonium hydride or having a complete reaction between the plutonium metal and the nitrogen gas is the problem that had to be solved. The present inventors found that it was extremely difficult for the reaction between plutonium hydride or plutonium metal powder to have 100% conversion to the plutonium mononitride. They therefore decided to vacuum treat the partially reacted plutonium mononitride powder at the elevated temperature of about 800° C. so as to decompose any residual plutonium hydride that might be present to hydrogen gas and plutonium metal that is highly reactive to nitrogen. The hydrogen is removed by evacuating the reaction chamber by means of a vacuum system. A further step is to introduced nitrogen gas into this chamber and at this elevated temperature so as to react the nitrogen with any plutonium metal which may be present.

It is therefore an object of this invention to provide a process whereby plutonium mononitride is made, said nitride being non-pyrophoric when exposed to a normal or air atmosphere.

Further objects will be apparent from the following description of a preferred embodiment of this invention.

Powdered plutonium metal is reacted with hydrogen in the atomic ratio of approximately 1 part hydrogen to 20 parts plutonium by slowly heating the powder to a temperature of about 300° C. After cooling the partially hydrided plutonium to about 100° C., nitrogen gas is introduced to a pressure of about 500 mm. The reaction chamber is then slowly heated to a temperature of about 800° C. The formation of plutonium nitride begins at about 300° C., and is nearly complete at 800° C. Once a temperature of about 800° C. is achieved within the reaction chamber, the system is evacuated so as to eliminate any residual plutonium hydride which may be trapped in the partially reacted plutonium mononitride powder. The vacuum treatment of the said powder is continued until no further gaseous products are observed. At this point, additional nitrogen gas is introduced into the reaction chamber to drive the nitriding reaction to completion while maintaining the temperature of the system at 700°–800° C. The resulting powder is essentially pure plutonium mononitride and this powder can be handled in an air atmosphere without it being ignited. The composition of the plutonium nitride compound contains 94.3 weight percent plutonium and 5.5 weight percent nitrogen, thus comparing favorably with the predicted stoichiometric values of 94.5 and 5.5 weight percent for plutonium and nitrogen, respectively.

Although only one detailed description has been outlined, minor changes involving the method of preparing the plutonium hydride prior to reacting with the nitrogen, sources of nitrogen other than nitrogen gas, and the use of plutonium metal without any hydriding step are all within the scope of this invention. The primary importance and advance of this invention over the prior art is (1) evacuating the partially nitrided plutonium powder at a temperature of about 700°–800° C. so as to remove any plutonium hydride that might be present, and (2) introducing additional nitrogen gas at this elevated temperature into the reaction chamber so as to complete the nitriding of any unreacted plutonium metal. Therefore, this invention should be understood to be limited only as is indicated by the appended claims.

What is claimed is:

1. A method of preparing nonpyrophoric plutonium mononitride, said method consisting of heating a powder, selected from the group consisting of at least one of plutonium metal and plutonium hydride, up to about 300° C. to 600° C. in a nitrogen atmosphere and within a closed vessel, said powder then being heated further to a temperature of about 800° C., evacuating the vessel and further heating at about 800° C. while any gaseous products that are evolved are removed through a vacuum system and then reacting the resulting outgassed powder with additional nitrogen at temperatures up to 800° C.

2. The method of claim 1 in which said powder is essentially plutonium metal.

3. The method of claim 1 in which said powder is essentially plutonium hydride.

4. The method of claim 1 in which the nitrogen is maintained under pressure during the initial heating step.

References Cited by the Examiner

AEC Document, BMI–1674 (DEL.), "Progress Relating to Civilian Applications During June 1964," pp. B–2 and B–3.

References Cited by the Applicant

BMI–1674, July 1, 1964, Studies of PuN and Its Alloys, W. M. Pardue, V. W. Storhok, R. A. Smith, P. H. Bonnell, D. L. Keller, J. E. Gates, R. F. Dickerson.

L. DEWAYNE RUTLEDGE, *Primary Examiner.*

BENJAMIN R. PADGETT, *Examiner.*

S. TRAUB, *Assistant Examiner.*